April 12, 1938. A. M. STONER 2,114,063
PERCOLATOR
Filed Oct. 14, 1936 2 Sheets-Sheet 1
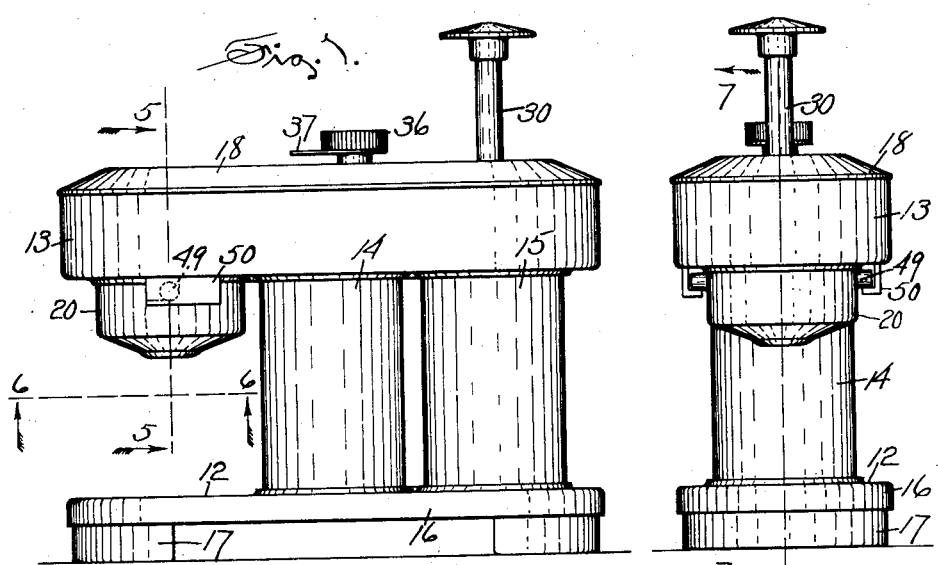
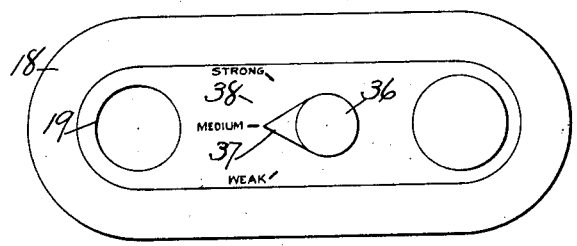
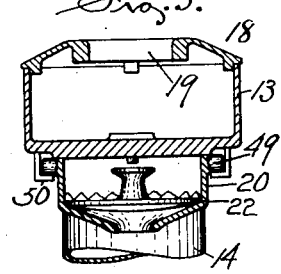
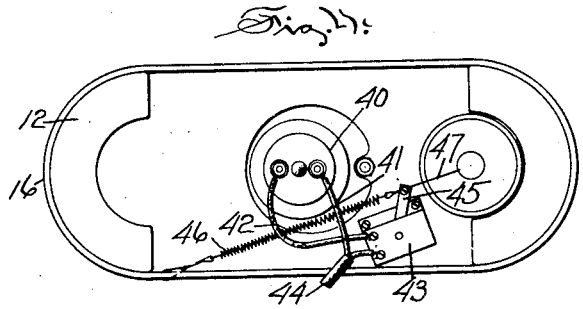
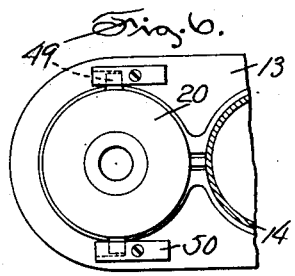
INVENTOR
Arthur M. Stoner,
by
Arthur B. Jenkins,
ATTORNEY

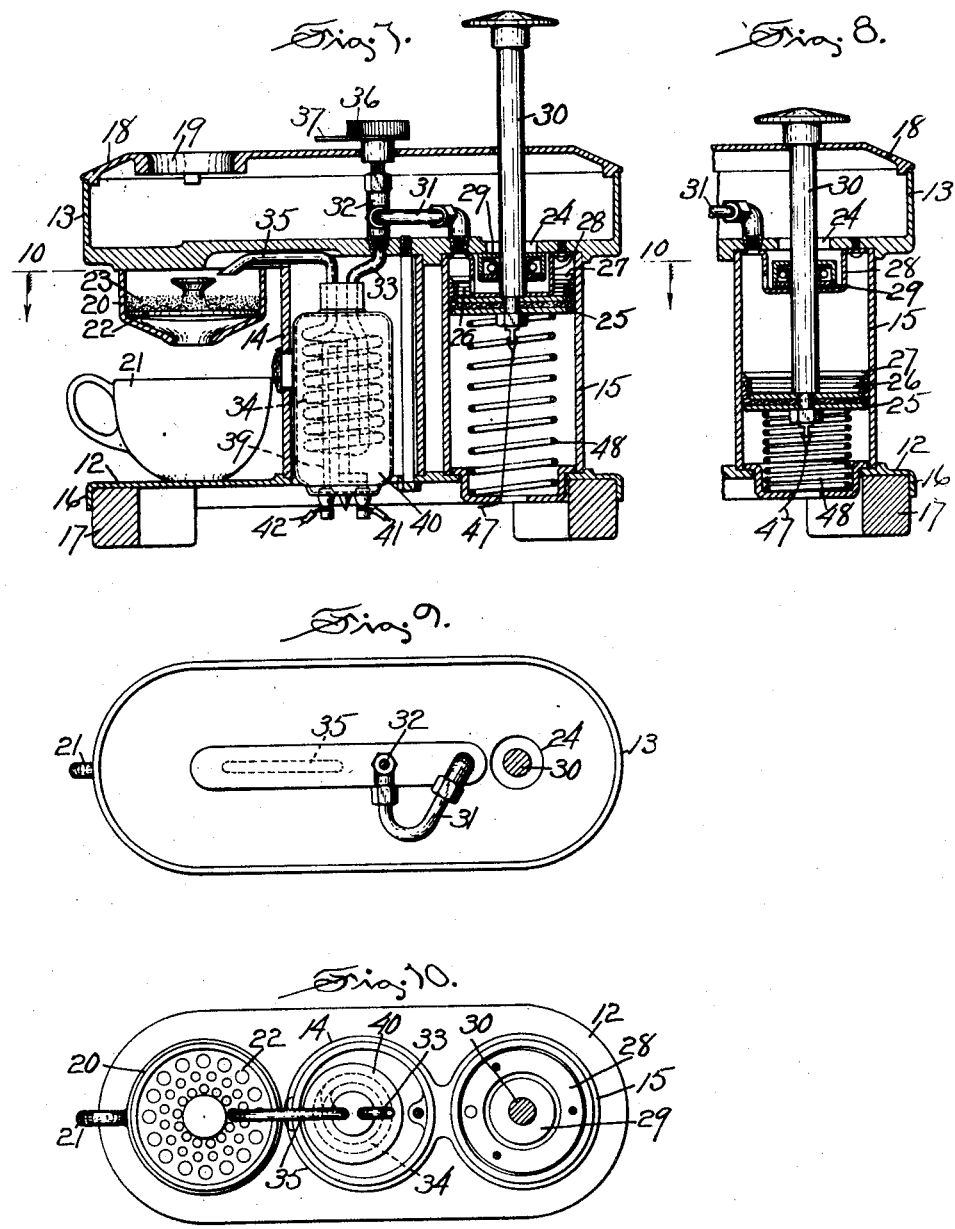

Patented Apr. 12, 1938

2,114,063

UNITED STATES PATENT OFFICE 2,114,063

PERCOLATOR

Arthur M. Stoner, West Hartford, Conn.

Application October 14, 1936, Serial No. 105,501

12 Claims. (Cl. 53—3)

My invention relates to the class of devices which are employed for preparing beverages, as coffee, by a filtering process, and an object of my invention, among others, is the production of a device of this class by means of which a beverage may be prepared in a simple and expeditious manner and with which the proper amount of liquid may be supplied for a cup of the beverage; and a further object of the invention is to provide a device of this type wherein the heating of the liquid shall take place only at the time each cup of the beverage is being prepared.

One form of a device embodying my invention and in the construction and use of which the objects herein set out, as well as others, may be attained is illustrated in the accompanying drawings in which Figure 1 is a side view of my improved percolator.

Figure 2 is an end view of the same.

Figure 3 is a top view.

Figure 4 is a bottom view.

Figure 5 is a view in vertical section on a plane denoted by the dotted lines 5—5 of Fig. 1.

Figure 6 is a bottom view of the device as seen in Fig. 5.

Figure 7 is a view in vertical section on a plane denoted by the dotted lines 7—7 of Fig. 2.

Figure 8 is a view in section through one end of the device as shown in Fig. 7 but with the plunger shown in its depressed condition.

Figure 9 is a top plan view with the cover removed.

Figure 10 is a view in cross-section on a plane denoted by the dotted lines 10—10 of Fig. 7.

In the accompanying drawings the numeral 12 denotes the base of my improved percolator which also comprises a head 13 supported on two cylinders, a heating cylinder 14 and a measuring cylinder 15 arranged in proximity one to another and rigidly secured in place. The base is provided with a flange 16 and it also comprises supporting blocks 17 preferably located at each end. The head 13 constitutes a reservoir for the reception of liquid, as water, to be used in the preparation of a beverage, and it is provided with a cover 18 having a filling opening 19 and holes for a measuring plunger and for the hub of an adjusting button to be hereinafter described. A basket 20 depends from an overhanging part of the head and overlying one end of the base which forms a support as for a cup 21 positioned for supply of a beverage thereto, and as shown in Fig. 7 of the drawings. A perforated disk 22 rests within the basket 20 above the outlet opening therefrom, this disk being for the support of the material, as coffee 23, which is used in the preparation of the beverage.

The measuring cylinder 15 communicates with the interior of the head 13 by an opening 24 through which the liquid, as water, flows downwardly. This flow is regulated by means of a measuring piston 25 pressed upwardly as by means of a spring 46. The piston, which in fact is a plunger may be of any suitable form, that herein shown, comprising a cup packing 27 the flange of which is thrust outwardly against the walls of the cylinder 15 as by means of a spiral spring 26, and as shown in Fig. 7 of the drawings. A cup 28 depends from the bottom of the head 13 within the cylinder 15 and in position to receive the piston 25. An opening extends from this cup into the chamber in said cylinder above said piston, and a valve 29 of any ordinary construction is frictionally attached to a measuring plunger 30 extending inwardly through the cover, as hereinbefore mentioned, through the opening 24, the frictional engagement being such as to govern flow of liquid from the reservoir through the opening 24. The measuring piston 25 is secured to the end of the plunger within the cylinder 15, and as shown in Fig. 7 of the drawings.

A tube 31 extends from the chamber in the cylinder 15 through the reservoir to a regulating fixture 32 and a tube 33 extends from said fixture and terminates in a heating coil 34 within the cylinder 14, the opposite end of the coil terminating in an outlet 35 opening into the basket 20.

A regulating valve, which may be a needle valve, is located in the fixture 32 to regulate the rapidity of flow of liquid to the coil 34, thereby regulating the strength of the beverage that will be produced in the operation of the device. This valve has a stem projecting outwardly and terminating in a button 36 outside of the cover 18, and as shown in Fig. 7 of the drawings. An index finger 37 attached to the valve stem operates in connection with a dial 38 displayed on the outer surface of the cover to denote the position of the valve to produce a beverage of a certain strength.

An electric heater 39 of any desired form and construction projects upwardly within the heating chamber 40 within which the coil 34 is located. Leads 41 and 42 operate in connection with a switch 43 to control the flow of electric current to the heater 39, a cable 44 providing for the supply of electric current. The switch 43 may be of any desired character and employs a switch lever 45 which is spring actuated in opposite directions past a "dead center", as will be readily understood by those skilled in the art and for which reason a detailed showing and description are omitted herein, this spring mechanism being comprised in the switch of well-known character. A spring 46 fastened at one end to a stationary support is attached at its opposite end to the lever 45, and a flexible connection 47 extends from the lever upwardly within the measuring cylinder 15 where it is attached to the end of the measuring plunger 30, said plunger therefore controlling the operation of the switch.

In the use of the device, the parts being in the positions shown in Figs. 4 and 7 of the drawings, the switch is open and no operation takes place. The reservoir containing a sufficient quantity of liquid, as water, is ready for use. The measuring plunger 30 now being pushed downwardly the connection 47 is slackened thereby permitting the spring 46 to move the lever 45 to the left from the position shown in Fig. 4 to close the switch, and this closing of the switch will take place promptly upon the depression of the plunger. Such depression moves the valve 29 downwardly, opening the passage 24 and the liquid is admitted to the cup 28 from which it flows through the opening in the side wall therein into the cylinder 15 above the piston 25. The valve contacting the bottom of the cup, its opening movement ceases, but the piston continues its downward movement thereby increasing the capacity of the liquid receiving chamber within the cylinder so that such chamber will be supplied with a quantity of liquid just sufficient to fill the cup 21. Pressure upon the plunger 30 being released, the spring 48 underneath the plunger will force the latter upwardly to its normal inoperative position, promptly moving the valve to close the opening 24 after which the plunger continues its upward movement independently of the valve. As the plunger moves upward liquid is forced from the chamber in the cylinder through the tube 31, the fixture 32, the tube 33, the coil 34, and out of the spout 35 into the ingredient, as coffee, within the basket 20 and from thence it percolates through the outlet from said basket into the cup 21. In its passage through the coil the liquid will be thoroughly heated by the action of the heater 39. As the plunger 30 approaches the end of its upward movement the slack in the connection 47 which was created in the downward movement of the plunger will be taken up sufficiently to move the lever 45 and thereby close the switch just before the plunger 30 reaches the end of its upward movement.

Under operative conditions the coil 34 with the tube leading thereto and the chamber in the cylinder 15 above the piston will be filled with liquid, and to initiate the operation this may be accomplished by one or more operations of the plunger and with or without operation of the electric switch. If it be desired not to operate the switch the connection 47 may be held taut while the plunger 30 is moved downwardly.

The basket 20 is removably held in place as by means of lugs 49 engaged within recesses in holders 50 secured to the underside of the overhanging part of the head 13, and as shown in Figs. 1, 2, and 5 of the drawings, the basket being slid into place when it is attached to the head for operation.

I claim:

1. A percolator comprising a reservoir, a measuring chamber communicating with said reservoir, a measuring plunger within said chamber for drawing a measured amount of liquid thereinto, means for automatically returning the plunger to its normal position to force liquid from said chamber, a heating chamber communicating with said measuring chamber, a heater within said heating chamber, a spout extending from said heating chamber, and a basket into which said spout delivers.

2. A percolator comprising a reservoir, a measuring chamber communicating with said reservoir, a measuring plunger within said chamber for drawing a measured amount of liquid thereinto, means for automatically returning the plunger to its normal position to force liquid from said chamber, means for preventing back flow of liquid into said reservoir, a heating chamber communicating with said measuring chamber, a heater within said heating chamber, a spout extending from said heating chamber, and a basket into which said spout delivers.

3. A percolator comprising a reservoir, a measuring chamber communicating with said reservoir, a piston within said chamber to draw a certain amount of liquid thereto, means for moving said piston in one direction, means for automatically forcing said piston in the opposite direction to drive liquid from said chamber, a heating chamber communicating with said measuring chamber, a heater within said heating chamber, a spout extending from said heating chamber, and a basket into which said spout delivers.

4. A percolator comprising a reservoir, a measuring chamber communicating with said reservoir, a piston within said measuring chamber to draw a certain amount of liquid thereto, a plunger to operate said piston, a valve attached to said plunger to close the opening from the reservoir to said measuring chamber, means for automatically returning the plunger to its normal position to force liquid from said chamber, a heating chamber communicating with said measuring chamber, a heater within said heating chamber, a spout extending from said heating chamber, and a basket into which said spout delivers.

5. A percolator comprising a reservoir, a measuring chamber communicating with said reservoir, a cup depending into said measuring chamber to receive liquid from said reservoir to draw liquid thereinto, a piston located in said measuring chamber, a plunger extending through said reservoir and cup and secured to said piston, means for automatically returning the plunger to its normal position to force liquid from said chamber, a valve within said cup to control the opening from the reservoir thereto, a heating chamber communicating with said measuring chamber, a heater within said heating chamber, a spout extending from said heating chamber, and a basket into which said spout delivers.

6. A percolator comprising a reservoir, a measuring chamber communicating with said reservoir, a piston within said measuring chamber for drawing a certain amount of liquid thereto from said reservoir, means for automatically returning the plunger to its normal position to force liquid from said chamber, a heating chamber communicating with said measuring chamber, a heater within said heating chamber, means connected with said piston for controlling the operation of said heater, a spout extending from said heating chamber, and a basket into which said spout delivers.

7. A percolator comprising a reservoir, a measuring chamber communicating with said reservoir, a cup depending into said measuring chamber underneath the opening thereto from said reservoir, a plunger extending through the reservoir and cup, a piston secured to the lower end of the plunger to draw liquid into said chamber, a valve attached to the plunger to control the opening from the reservoir, a heating chamber, means for automatically returning the plunger to its normal position to force liquid from said chamber, a heater within said heating chamber, means for controlling the heat to said heater, a connection between said controlling means and plunger for operating the former, a spout extending from said heating chamber, and a basket into which said spout delivers.

8. A percolator comprising a reservoir, a measuring chamber communicating with said reservoir, a plunger within said chamber for drawing a measured amount of liquid thereto and for automatically returning the plunger to its normal position to force liquid from said chamber, a fixture, a communicating passage between said measuring chamber and said fixture, a heater, a tube extending from said heater to said fixture, a valve in said fixture for regulating flow of liquid therethrough, a spout extending from said heater, and a basket into which said spout delivers.

9. A percolator comprising a reservoir, a measuring chamber communicating with said reservoir, means within said chamber for admitting a certain amount of liquid thereto and for automatically forcing it therefrom, a fixture located in said reservoir, a passage from said measuring chamber through said reservoir to said fixture, a valve in said fixture for regulating the rate of flow of liquid therethrough, a heater connected with said fixture to receive liquid therefrom, a spout projecting from said heater, and a basket into which said spout delivers.

10. A percolator comprising a base, two cylinders rising side-by-side from said base, a reservoir supported upon said cylinders, a piston within the measuring chamber in one of said cylinders to admit a certain amount of liquid from the reservoir to said cylinder and to automatically force said liquid from said chamber, means for operating said piston, a heater located in the other of said cylinders, a passage leading from said measuring chamber to said heater, a basket, and a spout for delivering liquid from said heater into said basket.

11. A percolator comprising a base, two cylinders rising side-by-side from said base, a reservoir supported upon said cylinders and having an overhanging part, a basket secured to said overhanging part, a spout delivering into said basket, a heater with which said spout is connected, said heater being located in one of said cylinders, a measuring chamber in the other of said cylinders, a communicating passage between said chamber and said heater, means for delivering a measured amount of liquid from said reservoir into said measuring chamber and for automatically forcing said liquid from said chamber, and means for preventing back flow of liquid from said measuring chamber into said reservoir.

12. A percolator comprising a base, two cylinders rising side-by-side from said base, a reservoir supported upon said cylinders and having an overhanging part, a basket depending from said overhanging part, a spout delivering into said basket, a heater located in one of said cylinders and with which said spout communicates, a fixture located in said reservoir and communicating with said heater, a valve in said fixture to regulate the rate of flow therethrough, a valve actuating button located atop said reservoir, a measuring chamber located in the other of said cylinders, a passage from said measuring chamber to said fixture, a piston located in said measuring chamber to admit a measured amount of liquid thereto, means for automatically forcing liquid from said chamber, a plunger secured to said piston and extending upwardly through said reservoir and the top thereof, and a valve secured to said piston to control flow of liquid through the opening from the reservoir into said measuring chamber.

ARTHUR M. STONER.